US011352479B2

(12) United States Patent
Piotrowski et al.

(10) Patent No.: US 11,352,479 B2
(45) Date of Patent: Jun. 7, 2022

(54) RIGID POLYURETHANE FOAM CONTAINING REACTIVE FLAME RETARDANT

(71) Applicant: ICL-IP America Inc., Tarrytown, NY (US)

(72) Inventors: Andrew Piotrowski, Yorktown Heights, NY (US); Joseph Zilberman, Haifa (IL); Jeffrey Stowell, Wingdale, NY (US); Mark Gelmont, Haifa (IL); Mayank Singh, Chesterbrook, PA (US); Zhihao Chen, Floral Park, NY (US); Eran Gluz, Hod Hasharon (IL)

(73) Assignee: ICL-IP America Inc., Tarrytown, NY (US)

( * ) Notice: Subject to any disclaimer, the term of this patent is extended or adjusted under 35 U.S.C. 154(b) by 375 days.

(21) Appl. No.: 16/630,574

(22) PCT Filed: Jul. 23, 2018

(86) PCT No.: PCT/US2018/043219
§ 371 (c)(1),
(2) Date: Jan. 13, 2020

(87) PCT Pub. No.: WO2019/023091
PCT Pub. Date: Jan. 31, 2019

(65) Prior Publication Data
US 2021/0079301 A1 Mar. 18, 2021

Related U.S. Application Data

(60) Provisional application No. 62/536,260, filed on Jul. 24, 2017.

(51) Int. Cl.

| | |
|---|---|
| ***C08G 18/18*** | (2006.01) |
| ***C08K 5/5313*** | (2006.01) |
| ***C08G 18/48*** | (2006.01) |
| ***C08G 18/42*** | (2006.01) |
| ***C08G 18/76*** | (2006.01) |
| ***C08G 18/24*** | (2006.01) |
| ***C08J 9/00*** | (2006.01) |
| ***C08J 9/30*** | (2006.01) |
| ***C08G 18/16*** | (2006.01) |
| ***C08G 18/28*** | (2006.01) |

(Continued)

(52) U.S. Cl.
CPC ............ *C08K 5/5313* (2013.01); *B65D 83/38* (2013.01); *C07F 9/3211* (2013.01); *C08G 18/165* (2013.01); *C08G 18/18* (2013.01); *C08G 18/244* (2013.01); *C08G 18/288* (2013.01); *C08G 18/4018* (2013.01); *C08G 18/42* (2013.01); *C08G 18/4208* (2013.01); *C08G 18/4241* (2013.01); *C08G 18/4829* (2013.01); *C08G 18/7614* (2013.01); *C08G 18/7621* (2013.01); *C08G 18/7671* (2013.01); *C08J 9/0038* (2013.01); *C08J 9/141* (2013.01); *C08J 9/146* (2013.01); *C08J 9/30* (2013.01); *C09K 21/12* (2013.01); *E04B 1/80* (2013.01); *E04B 1/942* (2013.01); *E04D 13/16* (2013.01); *C08G 18/388* (2013.01); *C08G 18/3878* (2013.01); *C08G 2101/00* (2013.01); *C08G 2110/0025* (2021.01); *C08J 2201/022* (2013.01); *C08J 2203/182* (2013.01); *C08J 2205/10* (2013.01); *C08J 2375/06* (2013.01); *C08J 2375/08* (2013.01); *G10K 11/162* (2013.01)

(58) Field of Classification Search
CPC ....... B65D 83/38; C07F 9/3211; C08G 18/14; C08G 18/165; C08G 18/18; C08G 18/244; C08G 18/2815; C08G 18/288; C08G 18/3878; C08G 18/388; C08G 18/4018; C08G 18/42; C08G 18/4208; C08G 18/4241; C08G 18/4829; C08G 18/7614; C08G 18/7621; C08G 18/7671; C08G 2101/00; C08G 2110/0025; C08J 9/0038; C08J 9/141; C08J 9/146; C08J 9/30; C08J 2201/022; C08J 2203/182; C08J 2205/10; C08J 2375/06; C08J 2375/08; C08K 5/5313; C09K 21/12; E04B 1/80; E04B 1/942; E04D 13/16; G10K 11/162
See application file for complete search history.

(56) References Cited

U.S. PATENT DOCUMENTS

| | | | | |
|---|---|---|---|---|
| 2,372,244 | A | 3/1945 | Adams et al. | |
| 3,249,562 | A | 5/1966 | Schoepfle et al. | |
| 3,317,638 | A | 5/1967 | Hartman et al. | |
| 3,505,431 | A * | 4/1970 | Birum | C07F 9/4006 558/158 |

(Continued)

FOREIGN PATENT DOCUMENTS

| | | | |
|---|---|---|---|
| DE | 2825818 | A1 | 1/1979 |
| GB | 1083939 | A1 | 9/1967 |

(Continued)

OTHER PUBLICATIONS

Extended European Search Report from Application No. 20 199 596.6 dated Jan. 27, 2021.

(Continued)

*Primary Examiner* — John M Cooney
(74) *Attorney, Agent, or Firm* — Dilworth & Barrese, LLP

(57) ABSTRACT

The present invention provides fire-retarded rigid polyurethane foam comprising the reaction product of polyol and isocyanate foam forming components and a dialkyl phosphorus-containing compound, namely a reactive mono-hydroxyl-functional dialkyl phosphinates, as flame retardant, serving as highly efficient reactive flame retardant in said rigid polyurethane foam.

13 Claims, No Drawings

(51) Int. Cl.

| | |
|---|---|
| ***B65D 83/38*** | (2006.01) |
| ***C07F 9/32*** | (2006.01) |
| ***C08G 18/40*** | (2006.01) |
| ***C08J 9/14*** | (2006.01) |
| ***C09K 21/12*** | (2006.01) |
| ***E04B 1/80*** | (2006.01) |
| ***E04B 1/94*** | (2006.01) |
| ***E04D 13/16*** | (2006.01) |
| *G10K 11/162* | (2006.01) |
| *C08G 101/00* | (2006.01) |
| *C08G 18/38* | (2006.01) |

(56) References Cited

U.S. PATENT DOCUMENTS

| | | | | |
|---|---|---|---|---|
| 3,597,509 | A | 8/1971 | Hans-Eberhard et al. | |
| 3,639,532 | A | 2/1972 | Oertel et al. | |
| 3,644,595 | A | 2/1972 | Wu et al. | |
| 4,407,981 | A | 10/1983 | Aaronson | |
| 6,090,968 | A | 7/2000 | Horold et al. | |
| 10,208,187 | B2 * | 2/2019 | Piotrowski ......... | C08G 18/4208 |
| 10,597,511 | B2 * | 3/2020 | Stowell .............. | C08G 18/4241 |
| 10,899,911 | B2 * | 1/2021 | Piotrowski ......... | C08G 18/4241 |
| 2011/0201733 | A1 | 8/2011 | Hill et al. | |
| 2011/0213062 | A1 | 9/2011 | Hill et al. | |
| 2011/0224339 | A1 | 9/2011 | Hill et al. | |
| 2011/0237722 | A1 | 9/2011 | Hill et al. | |
| 2011/0245386 | A1 | 10/2011 | Hill et al. | |
| 2011/0251312 | A1 | 10/2011 | Hill et al. | |
| 2011/0281983 | A1 | 11/2011 | Hill et al. | |
| 2012/0010312 | A1 | 1/2012 | Balbo Block | |
| 2016/0083500 | A1 | 3/2016 | Balbo Block et al. | |
| 2016/0137676 | A1 | 5/2016 | Rhudy et al. | |

FOREIGN PATENT DOCUMENTS

| | | | |
|---|---|---|---|
| GB | 1215106 | A1 | 12/1970 |
| GB | 2000535 | A | 1/1979 |
| WO | 2010051884 | A1 | 5/2010 |
| WO | 2014170316 | A1 | 10/2014 |
| WO | 2017083463 | A1 | 5/2017 |
| WO | 2017083468 | A1 | 5/2017 |
| WO | 2017083471 | A1 | 5/2017 |

OTHER PUBLICATIONS

International Search Report and Written Opinion from PCT/US2018/043219 dated Oct. 19, 2018.

Zhurnal Obshchei Khimi; Sep. 18, 1971.

U.S. Appl. No. 16/041,982, filed Jul. 23, 2018, claims provided.

PCT Patent Application No. PCT/US18/43228, filed Jul. 23, 2018, claims provided.

PCT Patent Application No. PCT/US18/43219, filed Jul. 23, 2018, claims provided.

PCT Patent Application No. PCT/US18/43218, filed Jul. 23, 2018, claims provided.

International Search Report and Written Opinion from PCT/US2018/043218 dated Oct. 18, 2018.

International Search Report and Written Opinion from PCT/US2018/043288 dated Oct. 19, 2018.

* cited by examiner

RIGID POLYURETHANE FOAM CONTAINING REACTIVE FLAME RETARDANT

CROSS REFERENCE TO RELATED APPLICATION

This application claims the benefit of U.S. provisional patent application Ser. No. 62/536,260, filed Jul. 24, 2017, the entire contents of which are incorporated by reference herein.

FIELD OF THE INVENTION

The disclosure herein provides for the use of reactive dialkyl phosphorus-containing compounds, namely hydroxyl-functional esters of dialkyl phosphinic acids, which compound, when reacted with polyol and isocyanate, serve as highly efficient reactive flame retardants in rigid polyurethane foams. The invention further provides fire-retarded polyurethane rigid foam with said hydroxyl-functional dialkyl phosphinates reacted and incorporated into the polymer matrix of a rigid polyurethane foam. The expressions "fire retardants" and "flame retardants" are used herein interchangeably.

BACKGROUND OF THE INVENTION

Brominated or phosphorus-based flame retardants are known to be highly effective and, in many cases, are the only options for reducing the fire risk of synthetic materials such as rigid polyurethane foams. However, the growing public and governmental scrutiny of chemicals, and in particular flame retardants, has increased over the years. The goal is towards more sustainable, reactive, polymeric and/or halogen-free new products. Scrutiny greatly diminishes if a flame retardant is reacted into the polymer matrix and cannot be leached-out.

Thus, there is a demand for reactive phosphorus-containing fire retardants for rigid polyurethane possessing such features as high phosphorus content, clear light color and good compatibility with polyether polyols and polyester polyols employed in the polyurethane industry.

SUMMARY OF THE INVENTION

The present invention provides a rigid polyurethane foam comprising a reactive dialkyl phosphorus-containing mono-hydroxyl-functional compound flame retardant, said flame retardant possessing highly satisfactory flame-retarding characteristics and having good compatibility with the polyol components of a rigid polyurethane foam-forming system. The expression "a rigid polyurethane foam-forming system" as used herein shall be understood to comprise a polyol, an isocyanate, a mono-hydroxyl-functional dialkyl phosphinate compound as described herein. The mono-hydroxyl-functional dialkyl phosphinate compounds are fully reactive through their single hydroxyl-functional group, and can be more easily formulated than di- or tri-hydroxyl-functional dialkyl phosphinate compounds. It has been surprisingly found that despite its lower content of hydroxyl-functionality, the reactive mono-hydroxyl functional dialkyl phosphinate compounds herein can be reacted and incorporated into the polymer structure of a rigid polyurethane foam, e.g., by reaction with the isocyanate component of the rigid polyurethane foam-forming system, without disrupting the properties of the rigid polyurethane foam. This means that the flame retardant of the invention becomes integrated into the rigid foam substrate, such that it is not released into the environment and is not likely to penetrate through cell membranes of living tissue, and therefore does not pose a health hazard. The invention further provides the rigid polyurethane foam-forming system described above, including but not limited to the reactive dialkyl phosphorus-containing mono-hydroxyl-functional compound(s) described herein.

The term "polyurethane" as used herein is understood to include both polyurethane and polyisocyanurate materials. Those skilled in the art are able to distinguish between polyurethane and polyisocyanurate materials and the distinctions shall not be discussed herein.

The term "foam" as used herein refers to rigid, semi-rigid and one-component (OCF) polyurethane and polyisocyanurate foams. The rigid polyurethane foam described herein, or claimed herein, as comprising, consisting essentially of, or consisting of the reacted mono-hydroxyl-functional dialkyl phosphinate compounds of the general formula (I-A) and/or (I-B), with the general formula (I-B) representing the group of phosphorus-containing diol and/or polyol reaction products of the partial phosphorylation of polyalcohols, which contain at least one phosphorus-containing group, are all understood herein to contain the aforementioned formula(e) as reactive materials, i.e., the aforementioned formula(e) are reacted into the rigid polyurethane material's structure, in which case the aforementioned formula(e) may not be present, or would not be present in the same structural formula(e) as described herein, but would be present in the rigid polyurethane material as a reaction product of a diol and/or polyol, an isocyanate and the structural formula(e) described herein.

The term "rigid" as used herein will be understood to comprise rigid foam, semi-rigid foam and one-component foam in polyurethane and polyisocyanurate formulations.

The term "polyol" as used herein will be understood as also possibly being defined as a diol and/or a polyol.

The expression "one-component foam" (OCF) as used herein is understood to be an in-situ polyurethane foam (DIN 18159) which is moisture-curing, and which is accommodated in pressurized containers, preferably, in disposable pressurized containers (aerosol cans) and which can comprise the polyol, isocyanate and flame retardant or flame retardant blends described herein. OCF's of polyurethane can be used in the building industry for sealing, insulation and assembly purposes, for example, although not limited to, being used in connection with sealing joints, roof surfaces, windows and doors.

In one embodiment, the OCF can be prepared from an isocyanate prepolymer which in turn is prepared by reaction of polyols with organic diisocyanates and/or polyisocyanates in the presence of a foam stabilizer and catalyst and, optionally, plasticizers, the flame retardants described herein, and other additives. The reaction of a OCF reaction takes place in the presence of liquefied gas in a pressurized container. After formation of the prepolymer, the foam can be discharged in measured quantities through a valve. The foam has a creamy consistency and cures under the effect of ambient moisture, for example from the air, undergoing an increase in volume in the process (one-component foam). An activator may also be added from another pressurized container immediately before application of the foam. The activator provides for faster tack-free curing of the foam (two-component foam). The activator may be a short-chain diol, for example ethylene glycol, propylene glycol, butane-1,4-diol or glycerol.

The flame-retardant blend of the present invention provides a flame-retardant effective amount of (A) mono-hydroxyl-functional dialkyl phosphinate compound of the general formula (I-A) and (I-B), and a group of phosphorus-containing diol and/or polyol reaction products of the partial phosphorylation of polyalcohols, which contains at least one phosphorus-containing group of the general formula (I-B), wherein formula (I-A) is:

(I-A)

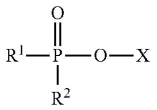

wherein:

$R^1$ and $R^2$, are selected from a linear or branched alkyl group containing from 1 to 4 carbon atoms, such as methyl, ethyl, propyl, isopropyl, butyl, and isobutyl, preferably methyl or ethyl, more preferably both $R^1$ and $R^2$ being ethyl; and, X is either -----$(Z)_k$—$R^3$ or 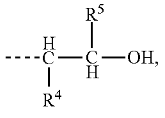

and when X is

-----$(Z)_k$—$R^3$,

Z is —(Y—O)$_n$—, wherein Y is a linear or branched alkylene group containing from 2 to 8 carbon atoms, preferably from 2 to 4 carbon atoms, more preferably ethylene, propylene, or isopropylene, and n represents an integer from 1 to 20, preferably from 1 to 5, and even more preferably from 1 to 2.

k may be 0 or 1;

$R^3$ is selected from hydrogen, a mono-hydroxy-terminated linear or branched alkylene group containing from 2 to about 8 carbon atoms, preferably from 2 to 4 carbon atoms; and, provided that when k is zero, $R^3$ is the mono-hydroxy-terminated linear or branched alkylene group and when k is 1, $R^3$ is hydrogen, and when X is

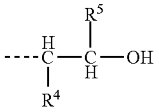

$R^4$ and $R^5$ are each independently selected from H, a linear or branched alkyl group containing from 1 to 8 carbon atoms, preferably from 1 to about 4 carbon atoms, and most preferably any one of methyl, ethyl or propyl, a linear or branched alkenyl group containing from 2 to 8 carbon atoms, preferably from 2 to about 4 carbon atoms, a halo-substituted alkyl group containing from 1 to 8 carbon atoms, an alkoxy group containing from 1 to 8 carbon atoms, preferably from 1 to about 4 carbon atoms, an aryl group containing from 6 to 12 carbon atoms, preferably from 6 to about 8 carbon atoms, and an alkylaryl group containing from 7 to 16 carbon atoms, preferably from 7 to about 12 carbon atoms, or $R^4$ and $R^5$ are bonded to each other to form a cycloalkyl group containing from 4 to about 8 carbon atoms, preferably 6 carbon atoms; and wherein formula (I-B) is:

(I-B)

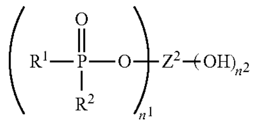

wherein:

$R^1$ and $R^2$, are independently selected from a linear or branched alkyl group containing from 1 to 4 carbon atoms, such as from methyl, ethyl, propyl, isopropyl, butyl, and isobutyl, preferably methyl or ethyl, more preferably both $R^1$ and $R^2$ both being ethyl; and, $n^1$ is an integer equal to or greater than 1, and $n^2$ is one, preferably $n^1$ is from about 1 to about 5 and $Z^2$ is a moiety derived from a diol or polyol which has a valence of $n^1$+$n^2$, and is of the general formula:

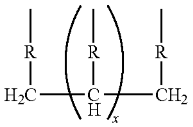

wherein R is selected from the group consisting of:

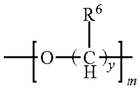 or 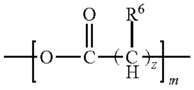

and where each $R^6$ independently is H or is an alkyl of from 1 to 4 carbon atoms, x is 0 or ≥1, preferably 1 to 4, more preferably x=1, y is 2 or 3; z is an integer of from 2 to 5; and, m≥1, preferably m=1.

There is also provided herein a process for the preparation of these compounds.

The compounds of formula (I-A) can be prepared by the reaction of mono-hydroxyl-functional-dialkyl phosphinic acids of formula (II) with compounds having an oxirane group, wherein formula (II) is:

(II)

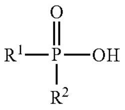

wherein $R^1$ and $R^2$ are as defined.

The compounds of formula (I-A) can also be prepared by the reaction of dialkyl phosphinic halides of formula (III) with aliphatic diols, wherein formula (III) is:

(III)

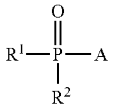

and wherein $R^1$ and $R^2$, are as defined, and A is chlorine or bromine.

The phosphorus-containing diols and/or polyols of the invention, for example those of formula I-B, can be prepared by the reaction of dialkyl phosphinic halides of formula (III) with aliphatic diols and/or polyols.

The reactive mono-hydroxyl-functional dialkyl phosphinates of this invention possess high phosphorus content, have good hydrolytic and thermal stability, exhibit good compatibility with the diol and/or polyol components of the rigid polyurethane foam-forming system, and are useful as highly efficient reactive flame retardants in rigid polyurethane foams.

The present invention further provides fire-retarded rigid polyurethane comprising the reactive residue of said phosphorus-containing mono-hydroxyl-functional compounds after being reacted in the rigid polyurethane foam-forming system to form the rigid polyurethane foam. The phosphorus-containing mono-hydroxyl-functional compounds herein can be used in the rigid polyurethane foam-forming system either individually or in an admixture with one another, and/or with other flame retardants, including halogen-containing flame retardants and phosphorus-containing flame retardants.

All the above and other characteristics and advantages of the invention will be better understood through the following illustrative and non-limitative detailed description of the preferred embodiments thereof.

DETAILED DESCRIPTION OF PREFERRED EMBODIMENTS

In one embodiment the mono-hydroxyl-functional dialkyl phosphinates of formula (I-A) can be those of the more specific formulae (I-A-1) or (I-A-2), wherein formula (I-A-1) is:

(I-A-1)

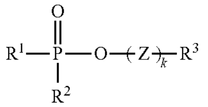

wherein R' and $R^2$, Z, k, and $R^3$ are as defined above; and, wherein formula (I-A-2) is:

(I-A-2)

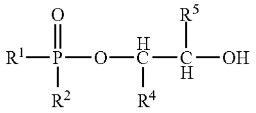

and wherein R', $R^2$, $R^4$ and $R^5$ are as defined above.

In one embodiment herein, the mono-hydroxyl-functional dialkyl phosphinates of formula (I-A) of the present invention are prepared by the reaction of dialkyl phosphinic acids of formula (II) with compounds of formula (IV), having oxirane groups, which formula (IV) is Formula (IV)

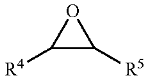

wherein:

$R^4$ and $R^5$ are as defined above.

In one other embodiment herein, the mono-hydroxyl-functional dialkyl phosphinates of formula (I-A) of the present invention are prepared by the reaction of dialkyl phosphinic halides of formula (III) with aliphatic diols of formula (V):

$$HO—(Z)_K—R^3 \quad (V)$$

wherein Z, $R^3$ and the subscript k are as defined above.

The phosphorus-containing diols and/or polyols of the present invention, for example those of formula (I-B), are prepared by the reaction of dialkyl phosphinic halides of formula (III) with aliphatic diols or polyols.

The dialkyl phosphinic acids (II) and dialkyl phosphinic halides (III) employed as starting materials in the process of the present invention are for the most part well known in the art. The compounds of formula (II) can be obtained for example by hydrolysis of the corresponding dialkyl phosphinic halides (III). The latter can be prepared for example by the method described in U.S. Pat. No. 3,104,259, the entire contents of which are incorporated by reference herein.

Specific oxirane compounds used in the process for preparing the compounds of formula (I-A) or more specifically (I-A-1) or (I-A-2) of the present invention are selected from the group consisting of, but not limited to, for example, ethylene oxide, propylene oxide, 1,2-epoxybutane, 1,2-epoxypentane, 1,2-epoxyhexane, 1,2-epoxy-5-hexene, 1,2-epoxy-2-methylpropane, 1,2-epoxyoctane, glycidyl methyl ether, glycidyl isopropyl ether, glycidyl isobutyl ether, glycidyl heptyl ether, glycidyl 2-ethylhexyl ether, glycidyl allyl ether, trimethylolpropane triglycidyl ether, styrene oxide, cyclohexene oxide, epichlorohydrin and combinations thereof. More preferably, ethylene oxide, propylene oxide and 1,2-epoxybutane are used as the oxirane compound.

Specific aliphatic diols used in the process for preparing the compounds of formula (I-A) or more specifically (I-A-1) or (I-A-2) of the present invention are selected from the group consisting of, but not limited to, for example, ethylene glycol, diethylene glycol, triethylene glycol, propylene glycol, dipropylene glycol, tripropylene glycol, 1,3-propane diol, 1,4-butane diol, 2-butene-1,4-diol, 1,5-pentane diol, 1,6-hexane diol, 1,8-octane diol, and other diols having molecular weights up to 700.

The aliphatic diols and/or polyols used in the process for preparing the phosphorus-containing polyols of the invention can generally be any suitable diols and/or polyols having at least two or at least three reactive hydrogen atoms, respectively, examples being those having functionality of from 2 or 3 to 6, preferably, 2, 3 and 4, and preferably a molecular weight of from about 100 to about 700. Specific aliphatic diols and/or polyols can be selected from the group of non-polymeric polyalcohols, for example, trimethylol propane, trimethylol ethane or glycerol.

Preferably, the diols and/or polyols to be used according to the present invention are polyether diols and/or polyols. This class of diols and/or polyols is obtained by the ringopening addition reaction of one or more alkylene oxides (e.g., ethylene oxide and propylene oxide) with a suitable reactant containing one or more active hydrogen atoms, such as alcohols, amine and acids; more specifically, said reactant may be selected from a group consisting of diols, triols, novolac resins, pentaerythritol, sorbitol, sucrose, diethylenetriamine and the like. Polyester-polyols may also be used according to the present invention; this class of polyols is obtained by the condensation reaction of carboxylic, dicarboxylic (or polycarboxylic) acid, such as adipic acid, phthalic acid or the like, with diols or triols. The aliphatic diols and/or polyols used in the process for preparing the phosphorus-containing mono-ols, diols or polyols of the present invention are selected from polymeric diols and/or polyols such as polyether polyols, polyester polyols, and mixtures thereof.

In a preferred embodiment of the present invention, the reaction of dialkyl phosphinic acids (II) with an oxirane compound is carried out in a medium of excess oxirane, with or without an organic solvent such as tetrahydrofuran, 1,4-dioxane, or toluene.

The amount of oxirane compound used in the reaction with mono-hydroxy dialkyl phosphinic acids (II) is a 5-300% molar excess relative to the mono-hydroxy dialkyl phosphinic acid, and preferably a 50-100% molar excess. Using a molar excess of the oxirane compound greater than 100% relative to the mono-hydroxy dialkyl phosphinic acid is inexpedient due to the need to recycle a large quantity of oxirane.

The mono-hydroxyl-functional dialkyl phosphinates of formula (I-A) or more specifically (I-A-1) or (I-A-2) of the present invention have a phosphorus content of about 8-18% by weight and a hydroxyl number of about 150-315 mg KOH/g, depending on the dialkyl phosphinic acid and the oxirane taken for the reaction.

It is preferred, for the preparation of the target mono-hydroxyl-functional dialkyl phosphinates (I-A) or more specifically (I-A-1) or (I-A-2) with the highest possible phosphorus content, to react mono-hydroxy-dialkyl phosphinic acids having the highest phosphorus content amongst the mono-hydroxy dialkyl phosphinic acids (II), with ethylene oxide and propylene oxide.

Thus, the compounds of formula (I-A) or more specifically (I-A-1) or (I-A-2), having particularly valuable properties are those wherein $R^1$, and $R^2$ are each ethyl.

Said reactions are carried out at a temperature of between 40° C. and 120° C., and preferably between 70° C. and 90° C. At a temperature lower than 40° C. the reaction becomes unacceptably slow. On the other hand, applying a temperature higher than 120° C. is not advisable since at such temperatures undesirable decomposition products may be formed.

In a preferred embodiment, the reaction of dialkyl phosphinic halides (III) with an aliphatic diol is carried out in a medium of excess diol.

The amount of diol compound used in the reaction with dialkyl phosphinic halides (III) is generally 2 to 10 moles per 1 mole dialkyl phosphinic halide, and preferably a 4 to 8 moles molar excess. The relatively large excessive amounts of these diols are required for minimizing the formation of undesirable bis(dialkyl phosphinate) esters of glycols and diols having no hydroxyl groups. Using a molar excess of the diol compound greater than 10 moles per 1 mole dialkyl phosphinic halide is inexpedient due to the need to recycle a large quantity of diol.

The mono-hydroxyl-functional dialkyl phosphinates of formula (I-A) or more specifically (I-A-1) or (I-A-2) of the present invention have a phosphorus content of about 2-18% by weight and a hydroxyl number of about 150-450 mg KOH/g, depending on the dialkyl phosphinic halide and the diol taken for the reaction.

It is preferred, for the preparation of the target mono-hydroxyl-functional dialkyl phosphinates (I-A) or more specifically (I-A-1) or (I-A-2) with the highest possible phosphorus content, to react dialkyl phosphinic halides having the highest phosphorus content amongst the dialkyl phosphinic halides (III), with ethylene glycol.

Thus, the compound of formula (I-A-1) having particularly valuable properties, is that wherein $R^1$ and $R^2$ are each ethyl, k is 1, n is 1, Y is $-CH_2CH_2-$, and $R^3$ is hydrogen.

Said reactions are carried out at a temperature of between 25° C. and 120° C., and preferably between 50° C. and 90° C. Applying a temperature lower than 25° C. results in a low yield. On the other hand, applying a temperature higher than 120° C. is not advisable since at such temperatures undesirable decomposition products may be formed. In addition, a catalyst can be used to accelerate reaction for example $MgCl_2$ or $ZnCl_2$.

In a preferred embodiment the reaction of dialkyl phosphinic halides (III) with an aliphatic diol is carried out in the presence of a strong base such as sodium hydroxide or potassium hydroxide, in a medium of both an organic solvent and an excess aliphatic alcohol. The organic solvent is selected from aromatic compounds. Especially suitable aromatic solvents are chlorobenzene, ortho-dichlorobenzene, mesitylene, and in particular, toluene and xylene. An effective amount of the base employed in the process is in a range of 1-1.2 mol per 1 mol dialkyl phosphinic halides (III), and preferably 1-1.05 mol.

Sodium or potassium hydroxide can be employed in a solid form. Water resulting from the reaction between the diol and the base should be eliminated from the reaction mixture as much as possible prior to the addition of dialkyl phosphinic halides (III).

In a preferred embodiment, the reaction of dialkyl phosphinic halides (III) with an aliphatic diol and/or polyol is carried out by varying the degree of partial phosphorylation of the diol and/or polyol. The phosphorus-containing diol and/or polyol according to the present invention comprises at least one phosphorus-containing group. This phosphorus-containing group is a group of formula (III-A).

(III-A)

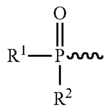

wherein:

wherein $R^1$ and $R^2$ are as defined, and wherein the wavy line indicates a bond to a diol or polyol via an oxygen atom.

The phosphorus-containing diol and/or polyol of the invention can also comprise two or more phosphorus-containing groups of formula (III-A), wherein these phosphorus-containing groups can be identical or different.

The reaction of dialkyl phosphinic halides (III) with an aliphatic diol and/or polyol can be carried out in the presence of an organic base which is selected from, but not limited to, the group of tertiary amines, for example, triethylamine, pyridine, diisopropyl ethyl amine, 1-methylimidazole. The amount of base used is equimolar to dialkyl phosphinic halide (III). The base can also be used in excess to the dialkyl phosphinic halide. Said reactions are typically carried out in a medium of inert organic solvent. Suitable solvents for the phosphorylation are, but not limited to, halogenated hydrocarbons, such as methylene chloride, chloroform or 1,2-dichloroethane. Solvents which are further suitable are ethers such as dioxane or tetrahydrofuran. Solvents which are further suitable are hydrocarbons such as hexane or toluene.

In a preferred embodiment the reaction of dialkyl phosphinic halides (III) with an aliphatic diol and/or polyol is carried out in the presence of a strong inorganic base such as sodium hydroxide or potassium hydroxide, in a medium of an organic solvent such as chlorobenzene, mesitylene, and in particular, toluene and xylene.

An effective amount of the base employed in the process is in a range of 1-1.2 mol per 1 mol dialkyl phosphinic halides (III), and preferably 1-1.05 mol. Sodium or potassium hydroxide can be employed in a solid form. Water resulting from the reaction between the diol, and/or polyol and the base should be eliminated from the reaction mixture as much as possible prior to the addition of dialkyl phosphinic halides (III).

The amounts of dialkyl phosphinic halide (III) and diol and/or polyol can be adjusted so that the desired degree of functionalization is attained. Partial phosphorylation of the diol and/or polyol can be achieved by using less than the stoichiometric amount of the dialkyl phosphinic halide (III) to the diol and/or polyol based on its functionality. In this way, only a portion of the OH groups in the diol and/or polyol is reacted with dialkyl phosphinic halide.

The phosphorus-containing diol and/or polyol of the present invention (also described herein as the partially phosphorylated diol and/or polyol) has a remaining average OH-functionality (following phosphorylation thereof) of 1 and a molecular weight of from about 200 to about 1000. The phosphorus-containing diols and/or polyols of the present invention have a phosphorus content of about 4-20% by weight and a hydroxyl number of about 20-800 mg KOH/g, depending on the dialkyl phosphinic halide and the diol and/or polyol taken for the reaction, and on the molar ratio between them.

The diol and/or polyol phosphorylation reactions are carried out at a temperature of between 0° C. and 100° C., and preferably between 10° C. and 90° C. Applying a temperature lower than 0° C. results in a low reaction rate. On the other hand, applying a temperature higher than 100° C. is not advisable since at such temperatures undesirable decomposition products may be formed.

The mono-hydroxyl-functional dialkyl phosphinate compounds of the invention are useful as reactive flame retardants. In one non-limiting embodiment it may useful to combine a phosphorus ester compound with the mono-hydroxyl-functional dialkyl phosphinate compounds of the invention. Some non-limiting examples of phosphorus esters are triethyl phosphate, tripropyl phosphate, triisopropyl phosphate, tributyl phosphate, tri-tert-butyl phosphate, tris (2-ethylhexyl) phosphate, trioctyl phosphate, dimethyl methylphosphonate, dimethyl propylphosphonate, diethyl ethylphosphonate, diethyl hydroxymethylphosphonate, diethyl N,N-bis(2-hydroxyethyl)aminomethylphosphonate, tris(chloropropyl) phosphate, tris(dichloropropyl) phosphate, aryl/alkyl phosphates, triaryl phosphates, bisphosphates, oligomeric phosphates and combinations thereof.

For rigid polyurethane foams it is preferred to optionally use hydroxyl-functional dialkyl phosphinates of the invention with a brominated product containing a hydroxyl group and for polyisocyanurate foams it is preferable to use no halogenated flame retardant.

The flame retardants or flame retardant blends as described herein may be used as-is, or as a mixture with halogenated or non-halogenated products. More preferable are compositions of the hydroxyl-functional dialkyl phosphinates or blends thereof with phosphate being combined with reactive brominated products containing a hydroxyl-group. For rigid polyurethane (PU) foams it is preferred to use a mixture with a brominated product, and for polyisocyanurate (PIR) foams, it is preferred to use a pure product.

A preferred brominated flame retardant to be used according to the present invention in combination with hydroxyl-functional dialkyl phosphinates, comprises one or more tribromophenol-terminated compounds represented by Formula (VI)

Formula (VI)

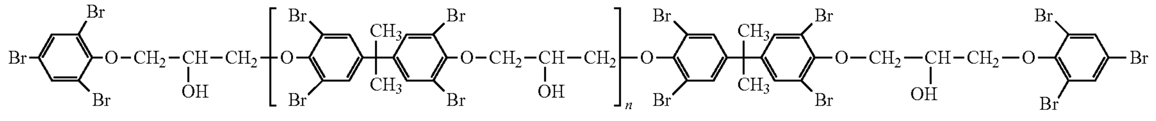

wherein:

n is an integer in the range between 0 and 5, and more preferably in the range between 0 and 4.

Such compounds can also be successfully dissolved in hydroxyl-functional dialkyl phosphinates, the liquid composition provided by the present invention, without altering the stability of the composition, such that the resulting composition retains the form of a solution at ambient temperature over a long storage period. A commercially available tribromophenol-terminated compound of formula (VI) is produced by Dead Sea Bromine Group under the trade name F-3014.

The weight concentration of the hydroxyl-functional dialkyl phosphinates relative to the total weight of the composition is preferably between 10 and 60%, and more preferably between 20 and 40%.

It has also been found that tribromoneopentyl alcohol, a flame-retarding agent represented by the structure of Formula (VII):

(Formula VII)

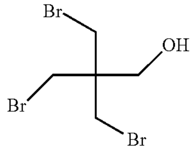

which is solid at room temperature, can also be successfully dissolved in hydroxyl-functional dialkyl phosphinates, the liquid composition provided by the present invention, without altering the stability of the composition, such that the resulting composition retains the form of a solution at ambient temperature over a long storage period. Preferably, the weight concentration of tribromoneopentyl alcohol is in the range between 10 and 60%, and more preferably in the range between 20 and 40%, relative to the total weight of the composition. Tribromoneopentyl alcohol is commercially available from Dead Sea Bromine Group under the trade name FR-513.

The composition of the present invention is particularly useful as a flame retardant for polyurethane and polyisocyanurate foams. As explained above, the liquid composition provided by the present invention is a solution that contains the hydroxyl-functional dialkyl phosphinates of Formula (I-A, or more specifically (I-A-1) or (I-A-2)) or (I-B) in combination with the compound of Formula (VI), or separately with tribromoneopentyl alcohol (VII), and preferably as a solute of the hydroxyl-functional dialkyl phosphinates of Formulae (I-A, or more specifically (I-A-1) or (I-A-2)) or (I-B) with both the compounds of Formula (VI) and Formula (VII), and may therefore be directly added to the liquid mixture of reactants used for preparing polyurethane and polyisocyanurate foams, whereby the blending operation of said mixture is considerably simplified and a uniform distribution of the components to be reacted is readily obtained in said mixture.

In another embodiment herein the brominated flame retardant is selected from the group consisting of brominated bisphenol A compounds, brominated bisphenol S compounds, brominated bisphenol F compounds, brominated bisphenol A carbonate oligomers, brominated bisphenol A epoxy resins, end-capped brominated bisphenol A epoxy resin, aliphatic brominated alcohols and glycols, dibromoneopentyl glycol, brominated phthalates and tetrabromophthalate diols, brominated phosphates, brominated phenols, brominated phthalic acids, and combinations thereof.

The amount of the brominated flame retardant to be used according to the present invention varies depending on the relationship between the extent of the flame retardation required of polyurethane foam and physical properties. However, the brominated flame retardant is usually used in an amount of 1 to 50 parts by weight based on 100 parts by weight of polyurethane foam. In an amount of less than 1 part by weight, desired flame retardancy cannot be imparted. Amounts exceeding 50 parts by weight bring about sufficient flame retardancy but may impair the physical properties of the molded or formed product of the resulting foam. Amounts outside the above-described range are therefore not preferred. From the viewpoint of keeping good balance between the flame retardancy and physical properties, the amount practically falls within a range of 3 to 30 parts. Depending on the end use application, two or more brominated flame retardants can be used in combination.

Thus, the flame retardant compositions of the present invention may be used as preformed concentrates that can be added to standard formulations suitable for obtaining rigid polyurethane foams (by continuous, discontinuous or spray methods) or polyisocyanurate foams.

In another aspect, the present invention provides a composition of the hydroxyl-functional dialkyl phosphinates (I-A) or more specifically (I-A-1) or (I-A-2) or I-B with either halogenated or non-halogenated products (or both).

The weight ratio between the compound of Formula (I-A-1) or (I-A-2) out of general formula I-A and the other products in the flame-retardant composition of the invention is between 1:9 and 9:1, and more preferably between 30 and 70%. The brominated flame retardants, for example tribromoneopentyl alcohol (FR-513) and tribromophenol-terminated compounds represented by Formula (VI), may be included in the composition of the invention, such that the weight concentrations of the hydroxyl-functional dialkyl phosphinates of the invention, tribromoneopentyl alcohol (VII) and tribromophenol-terminated compounds represented by Formula (VI) in the flame-retardant composition of the invention, are in the ranges from 10 to 50 wt %, 10 to 50 wt % and 10 to 50 wt %, respectively.

In one embodiment, mono-hydroxyl-functional dialkyl phosphinate of formulae (I-A), (I-A-1), (I-A-2) or (I-B) of the flame-retardant blends with phosphate compound as described herein are provided such that the hydroxyl-functional dialkyl phosphinate and if present, the phosphate component(s) are blended with reactive brominated products containing a hydroxyl-group such as the non-limiting examples described above.

The mono-hydroxyl-functional dialkyl phosphinate compounds of the present invention are highly efficient reactive flame retardants when incorporated into rigid polyurethane foams alone or with a phosphate compound. It should be noted that the flame retardant blend(s) of the invention are useful over a broad Isocyanate Index (abbreviated herein MDI or TDI). The index refers to the ratio of isocyanate practically used in the formulation vs. the theoretical stoichiometric amount of isocyanate required, expressed in percentages.

The rigid polyurethane foams herein contain a typical flame-retardant-effective amount of the flame retardant (i.e., the mono-hydroxyl-functional dialkyl phosphinate). Typically, the phosphinate are applied in amounts that provide a total phosphorus concentration in the polymer (i.e., the rigid polyurethane foam) in the range of 0.3 to 15 wt %, based on the total weight of the polymer. Preferably, the total phosphorus concentration in the polymer is in the range of 1 to 10 wt % and more preferably, in the range of 1.5 to 5 wt %, based on the total weight of the rigid polyurethane polymer. Most preferably, the amounts used of the phosphinate of this invention are at least sufficient to meet the current requirements of the DIN 4102 B2 test and/or the LOI flammability Test Method.

Besides rigid foam, there exists another useful type of foam generally classified as semi-rigid which herein is classified within the general overall definition of rigid. These rigid and semi-rigid foams, which are used as shock-absorbing materials in the passenger compartments of automobiles and elsewhere, are usually made by reacting a polyisocyanate with a mixture of a foam polyol and a crosslinking agent such as trimethylolpropane.

Whilst the production of all polyurethane foams, rigid or semi-rigid, involves the same basic chemical reaction, that between isocyanate groups and hydroxyl groups, each type of foam presents different problems to the manufacturer. The differences are often associated with the balance which must always be achieved between gas generation and polymer gelation. Many of these problems can be solved, at least partially, by appropriate choice of auxiliary agents, for example blowing agents, catalysts, surfactants, foam stabilizers and the like.

Rigid polyurethane foam as used herein is made from more highly branched, lower equivalent weight polyether/polyester polyols with functionalities as high as 8. In a rigid polyurethane foam a higher concentration of aromatic polyisocyanate is needed than in a flexible foam. A rigid polyurethane foam obtainable by the method of the present invention preferably has a core density of from 10 to 50 $kg/m^3$, more preferably from 20 to 40 $kg/m^3$.

Rigid foams as used herein are made using both polyether and polyester polyols. For rigid polyurethane foams (PUR), very high functionality polyols (>3) are used, for polyisocyanurate (PIR) foams, a lower functionality polyol (<3) is used to compensate for the higher friability. Polyols used herein having a 400 to 800 molecular weight. A rigid polyurethane foam as used herein is characterized by having a core foam density of 2.0 pounds per cubic foot or lower, closed cell content in a range of 95-99%, initial thermal resistance from 6.0 to 8.0 $ft^2$. h.° F./Btu.in at 10° C., mainly used in insulation application.

Rigid foams have been used in the auto, thermal insulation and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably low in volatile organic compounds, especially volatile isocyanates and amines. The individual components are preferably storage-stable at room temperature for an extended period.

The term semi-rigid as applied to foams is a standard term used in the art. Generally such foams were formulated into a very light density, whereas rigid closed-cell material bears a load but cracks easily when subject to an impact force.

The method of making the rigid polyurethane foam of the invention can comprise combining the diol and/or polyol component and/or the isocyanate component or catalyst and one or more of the flame retardant materials of Formulae (IA), (I-A-1), (I-A-2) and (I-B) which may be metered and pumped into a common mixing vessel, and then the resulting mixture may easily be moved to the polymerization site for use in molds, slab stock operations, etc.

The reactive flame retardants may also be admixed with the diol and/or polyol reactant before combination with the isocyanate reactant. It is also within the scope of the invention to mix the reactive flame retardant material(s) with the isocyanate before combining such mixture with the diol and/or polyol reactant. However, if the isocyanate and the aforementioned flame retardant materials are mixed and allowed to stand at room temperature for a substantial period of time, reaction may occur. The "reaction product" as used in the claims and specification herein, can in one embodiment comprise reacting the contents of the rigid polyurethane foam-forming system in any one of the aforementioned methods, and may further include reacting the reactive flame retardant via a pre-polymer technique, such as for example, reacting an excess of isocyanate with polyol to form an isocyanate terminated pre-polymer and then further reacting the prepolymer with the reactive flame retardant and optionally non-reactive flame retardants described herein.

The flame retardant materials of Formulae (IA), (I-A-1), (I-A-2) and (I-B) described herein may be described as isocyanate-reactive (NCO-reactive) materials, i.e., they are reactive with the isocyanates through the hydroxyl group(s).

The diols and/or polyols used in making the rigid polyurethane foams described herein can include any organic polyol, including diols, polyols, and polyether, polyester, polyesteramide, mannich based polyols having hydrogen atoms that are reactive with isocyanates may be used. Generally, these materials have molecular weights ranging from about 400 to about 800 and have from 2 to about 10 or more hydroxyl groups per molecule and weight percent hydroxyl contents ranging from about 7.0 to about 15. They generally have hydroxyl numbers of from about 350 to as high as 600 or even 700.

In the polyol type of reactant the acid number should be less than 10 is usually as close to 0 as possible. These materials are referred to conveniently as the "polyol" reactant. The useful active hydrogen-containing diol and/or polyols include the large family of adduct compounds which result when ethylene oxide, propylene oxide, 1,2- and 2,3-butylene oxide, or other alkylene oxides are added to such active hydrogen compounds such as diols, glycols and polyols presented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base diol, polyol or amine molecules referred to, depending upon the intended use of the polyurethane.

For example, a diol and/or polyol for use in making rigid foams could be well represented by glycerine to which sufficient propylene oxide was added to give a final hydroxyl content of about 8.0%. Such a material would have a molecular weight of about 450.

This technique of controlling flexibility by selection of the diol and/or polyol molecule and the subsequent amount of alkylene oxide added is well known to those in the art.

In addition to the glycols and the like which can serve as the base polyol molecule for addition of the alkylene oxides and thus yield the "polyol" molecule for reaction with the isocyanate, one can use a starting molecule which contains primary and/or secondary amine groups which have hydrogen reactive toward alkylene oxides. Here also, the quantity of alkylene oxide added depends on the intended uses of the final polyurethane products.

Representative amines which may serve as active-hydrogen containing molecules for reaction with epoxides are those having from 1 to about 6 or more amino nitrogens, examples of which are ethyl amine, ethylene diamine, diethylenetriamine, triethylenetetramine, tetrapropylenepentamine and other linear saturated aliphatic alkylene amines, the important requirement being at least two, and preferably more, say 3 to 8 or 10 active hydrogen sites to which the alkylene oxide may be added.

It is also well known to use the hydroxyl bearing molecules which have been prepared by esterification type reactions from polyfunctional acids or anhydrides and polyfunctional alcohols as the active hydrogen compounds used in preparing the polyurethane systems. These compounds are often called polyester polyols. Typical acids used in making these polyester polyols are maleic, phthalic, succinic, fumaric, tetrahydrophthalic, chlorendic, and tetrachlorophthalic acids. Typical diols and/or polyols are ethylene, propylene, butylene, diethylene, and dipropylene, glycols, and polyethylene, polypropylene, glycols and glycerine, trimethylol propane, hexanetriol, pentaerythritol, sorbitol and the like. Where available the above mentioned acids may be used in the anhydride form if desired.

In making the polyester-polyols, any of the various polyfunctional acids or anhydrides or mixtures thereof are caused to react with any of the diols, glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those skilled in the art.

In the art and technology of making rigid polyurethanes, it is also known to employ what is called prepolymer techniques. This is a technique wherein part of the reaction involved in making rigid polyurethane is carried out yielding a prepolymer of increased molecular weight and with either resultant end groups of hydroxyls or isocyanates depending on the stoichiometric used in making this prepolymer. This prepolymer is then used to prepare the final rigid polyurethane product by reacting it with either a isocyanate or polyol, depending on, as mentioned above, whether the terminal groups of the prepolymer are hydroxyls or isocyanates, respectively.

Broadly, any of the prior art polyesters, isocyanate-modified-polyester prepolymers, polyesteramides, isocyanate-modified-polyesteramides, alkylene glycols, isocyanate-modified alkylene glycols, polyoxyalkylene glycols, isocyanate-modified polyoxyalkylene glycols, etc., having free reactive hydrogens and especially hydroxyl groups may be employed for the production of the polyurethanes described herein.

Examples of isocyanates which can be used include those having two or more isocyanate groups which have heretofore been used for making rigid polyurethane foams. Examples of such isocyanate compounds include aromatic isocyanates, aliphatic isocyanates and alicyclic isocyanates, as well as mixtures of two or more of such isocyanates, and modified isocyanates obtained by the modification of such isocyanates. Specific examples of such isocyanates are toluene diisocyanate, diphenylmethane diisocyanate, polymethylene polyphenylene polyisocyanate (crude MDI), xylylene diisocyanate, isophorone diisocyanate and hexamethylene diisocyanate; and modified products of such isocyanates, such as carbodiimide-modified products, biuret-modified products, dimers and trimers. Prepolymers with terminal isocyanate groups obtained from such isocyanates and active hydrogen-containing compounds can also be used.

In one embodiment, the isocyanate index range for rigid polyurethane foams can be from about 400 to about 150, more preferably, from about 375 to about 175 and most preferably from about 350 to about 200.

As the blowing agent in the rigid polyurethane foam-forming composition of the present invention, known blowing agents heretofore used in such compositions are suitably selected according to the properties required of the foamed product.

In the present invention, a cross-linking agent is also used as the case requires.

As the cross-linking agent, a compound having at least two functional groups having active hydrogen, such as hydroxyl groups, primary amino groups or secondary amino groups is preferred. However, in a case where a polyol compound is used as the cross-linking agent, the following is taken into account. Namely, a polyol compound having a hydroxyl value of at least 50 mg KOH/g and more than four functional groups, is considered to be the cross-linking agent, and a polyol which does not satisfy this, is considered to be any one of polyols of the above-mentioned polyol mixture (polyol (1), (2) or other polyol). Further, two or more cross-linking agents may be used together. As specific examples, a polyhydric alcohol such as dextrose, sorbitol or sucrose; a polyol having an alkylene oxide added to a polyhydric alcohol; an amine compound such as monoethanolamine, diethanolamine, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine; and a compound obtained by adding an alkylene oxide thereto, may, for example, be mentioned.

When the above cross-linking agent is used, even in a case where, for example, a large amount of a blowing agent is used to produce a rigid foam having a low density, the foaming stability will be good, and it will be possible to produce such a rigid foam. Especially when a diol and/or polyol having a high-molecular weight is used, it is possible to produce a rigid foam having a low density which used to be considered difficult to foam. Further, when the cross-linking agent is used, the durability will be improved, as compared with a case where it is not used. In a case where a diol and/or polyol having a high-molecular weight is used as in the present invention, the foaming stability can readily be improved particularly when a compound having a relatively high-molecular weight, such as a molecular weight of at least 4000, is used.

Water is a typical example of such a blowing agent; other examples include methylene chloride, n-butane, isobutane, n-pentane, iso-pentane, dimethyl ether, acetone, carbon dioxide, and the like. Depending on the desired density and other properties of the foamed polyurethane, these and other blowing agents can be used alone or in combinations of two or more in a manner known in the art.

The amount of blowing agent to be used is not particularly limited but will ordinarily range from 0.1 to 30 parts by weight per 100 parts by weight of the diol and/or polyol component of the foam-forming composition. Preferably, the amount of blowing agent(s) will be such as to provide a foam density of from 0.8 to 2.5 pounds per cubic foot, and preferably from 0.9 to 2.0 pounds per cubic foot.

The polyurethane foam-forming composition herein can preferably contain any of the catalysts, and combination of catalysts, heretofore known or used for the production of polyurethane foams. Examples of useful catalysts include sodium hydroxide, sodium acetate, tertiary amines or materials which generate tertiary amines such as trimethylamine, triethylene diamine, N-methyl morpholine, N,N-dimethyl cyclohexylamine, and N,N-dimethyl aminoethanol. Also applicable are metal compounds such as hydrocarbon tin alkyl carboxylates, dibutyl tin diacetate, dibutyl tin dioctoate dibutyl tin dilaurate and stannous octoate; as well as other compounds intended to promote trimerization of the isocyanate such as, 2,4,6-tris(N,N-dimethylamino-methyl)phenol, 1,3,5-tris(N,N-dimethyl-3-aminopropyl)-S-hexahydrotriazine, potassium octoate, potassium acetate and catalysts such as DABCO TMR® and POLYCAT 43®.

Many other kinds of catalysts can be substituted for those listed above, if desired. The amount of catalyst used can advantageously range from 0.05 to 5 weight percent or more based on the total weight of diol and/or polyol in the foam-forming mixture.

The NCO index which is applied in making the semi-rigid foam according to the present invention is 126-180 and preferably 130-175. The NCO index which is applied in making the rigid foam according to the present invention is 181-350 and preferably 200-300. It is commonly understood that the NCO index of polyurethane foams is from about 80-130 and the NCO index of isocyanurate foams is from about 200-350.

The densities of the semi-rigid foams may range of from 8 to 180 and preferably 8-80 and most preferably 8-48 $kg/m^3$.

The densities of the rigid foams may range of from 8 to 180 and preferably 8-80 and most preferably 8-48 $kg/m^3$.

Surfactants, including organic surfactants and silicone-based surfactants, may be added to serve as cell stabilizers. Some representative materials are sold under the designations SF-1109, L-520, L-521 and DC-193, which are, generally, polysiloxane polyoxylalkylene block copolymers. Also included are organic surfactants containing polyoxyethylene-polyoxybutylene block copolymers. It is particularly desirable to employ a minor amount of a surfactant to stabilize the foaming reaction mixture until it cures. Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, a surfactant total amount from about 0.2 to about 3 wt %, based on the formulation as a whole, is sufficient for this purpose. However, it may be in some embodiments desirable to include some surfactants, e.g., DABCO DC-5598, available from Air Products and Chemicals, Inc., in a higher amount. In view of this a surfactant may be included in the inventive formulations in any amount ranging from 0 to 6 wt. %, based on the diol and/or polyol component.

Finally, other additives such as fillers and pigments may be included in the polyurethane foam-forming formulations described herein. Such may include, in non-limiting embodiments, barium sulfate, calcium carbonate, graphite, carbon black, titanium dioxide, iron oxide, microspheres, alumina trihydrate, wollastonite, prepared glass fibers (dropped or continuous), polyester fibers, other polymeric fibers, combinations thereof, and the like. Those skilled in the art will be aware without further instruction as to typical and suitable means and methods to adapt the inventive formulations to produce rigid polyurethane foams that, though still falling within the scope of the claims appended hereto, exhibit or benefit from desired property and/or processing modifications.

Rigid foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably low in volatile organic compounds, especially volatile isocyanates and amines. The individual components are preferably storage-stable at room temperature for an extended period.

The term semi-rigid as applied to foams is a standard term used in the art. Generally, such foams have a glass transition temperature (Tg) between rigid and flexible foams.

The rigid polyurethane foams described herein, be they be can be utilized in the construction and formation of various articles such as automotive insulation, panel insulation for wall panel and roof panel construction, and pour-in-place and spray foam insulation for wall panels and roof panels.

Rigid and semi-rigid polyurethane foam has many applications such as an imitation lumber and a structural material. In addition, rigid polyurethane foam can be used in applications such as insulation, construction and packaging; microcellular froth polyurethane foam such as footwear and gasketing; and viscoelastic ("memory") polyurethane foam chemistries, in air filters and as decorative facings for speakers, foam sheets produced on laminating machines with suitable facings or vapor barriers, tank and pipe insulation, applied by sheet, molding and spray techniques, insulation for refrigerators, freezers, water heaters, use in flotation and packaging. The insulation can also comprise window and door insulation.

The insulation can be used in any structural component such as a roof or wall. There is also provided a roof structure comprising joists supporting a structural deck and insulation panels such as those described above positioned above the structural deck, wherein optionally coverboards are positioned thereover, and then a water-proof layer such as built-up roofing or bitumen, or the like is applied thereover, and then there is applied thereover conventional roof coverings such as shingles, tiles, and the like.

There is also provided a wall structure comprising a frame coupled together with structural support members such as wood, steel or concrete beams, a single layer or a plurality of rigid foam insulation boards, e.g., polyisocyanurate foam boards, affixed to the exterior of the frame, for form a continuous outside wall, wherein such coupling and affixing is done with fasteners such as nails, screws, rivets and the like, and wherein there is space formed between the structural support members, and insulation is located within the space so formed, and optionally wall boards are fastened to the interior of the frame to form an internal surface.

The following examples illustrate specific embodiments of both the preparation of certain compounds of the invention and the utility of these compounds as reactive flame retardants in rigid polyurethane foams.

EXAMPLES

Preparation Example 1

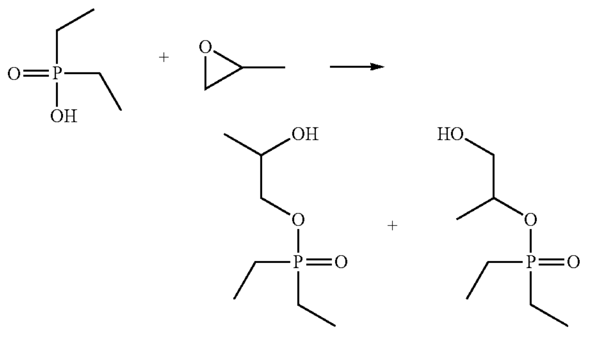

Mixture of isomers

A 2-liter, jacketed, hastelloy reactor equipped with a mechanical stirrer, oil heater and positive displacement laboratory pump was charged with diethyl phosphinic acid (779 g, 6.38 mol) and sealed. The reactor was heated to an internal temperature of 45° C. Propylene oxide (743 g, 12.77 mol) was added to the reactor via the pump over two hours with the temperature being maintained below 65° C. Subsequently the reactor internal temperature was increased to 90° C. and maintained there for three hours. The excess propylene oxide was evaporated and the residue was distilled under vacuum (300-500 mTorr) using a wiped film evaporator at a jacket temperature of 125° C. The target fraction was collected as a clear, colorless liquid. The yield was 90% with respect to the starting diethyl phosphinic acid. The product was a mixture of two isomers of hydroxyl-functional esters of diethyl phosphinic acid, $^{31}P$ NMR (acetic acid-$d_4$, ppm): 66.8-67.7; and had an acid # of 0.4 mg KOH/g and a phosphorus content of 15.9%.

Preparation Example 2

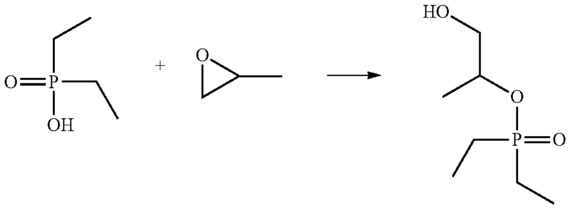

A 1-liter flask, with a heating mantle, mechanical stirrer, reflux condenser, dip tube, j-chem controller and thermocouple, and caustic scrubber was charged with diethyl phosphinic acid (469 g, 3.84 mol). The flask was heated to 80° C. and ethylene oxide from a pressurized cylinder was charged into the reactor through the dip tube over five hours. Final molar ratio of ethylene oxide to diethyl phosphinic acid was 1.33. The reaction mixture was kept at 80° C. for additional three hours. Further nitrogen was passed through the dip tube to remove the excess ethylene oxide. A batch distillation of the residue was done at 150° C. and 200 mTorr resulting in a clear liquid (400 g). The product was 2-hydroxyethyl ester of diethyl phosphinic acid, $^{31}P$ NMR ($CDCl_3$, ppm): 79; and had an acid # of 0.4 mg KOH/g.

Application of the new compounds of the present invention is demonstrated through their use as flame retardants in standard formulations for rigid polyisocyanurate foams (Application Example 1) and for rigid polyurethane foam (Application Example 2). The following components were used in preparation of the polyurethane foams:

| Materials | Manufacturer |
|---|---|
| Stepanpol PS-2352 aromatic polyester polyol | Stepan |
| Terate HT 5100 aromatic polyester polyol | Invista |
| Jeffol R-425X polyether polyol | Huntsman |
| PEL-CAT 9540-A Potassium Catalyst | Ele Corporation |
| PEL-CAT 9650 Potassium Catalyst | Ele Corporation |
| Niax catalyst C-5 (N,N,N',N',N" Pentamethyldiethylene triamine) | Momentive |
| Tegostab B8512 silicone stabilizer | Evonik |
| Dabco DC 193 surfactant | Air Products |
| Dabco BL-11 amine catalyst | Air Products |
| Polycat 77 amine catalyst | Air Products |
| BiCAT 8220 | Shepherd Chemical |
| HFC-245fa blowing agent | Honeywell |
| N-Pentane | Philips 66 |
| PAPI 580N polymeric MDI | Dow |
| Rubinate M polymeric MDI | Huntsman |
| New FR Product (from Preparation Example 1) | ICL |
| Fyrol PCF, FR-513, F-3014 | ICL |

Application Example 1

Process of preparing rigid polyisocyanurate foam (PIR, NCO index 250) using the New FR Product was as follows:

Foam samples were prepared by mixing the pre-weighted polyol, water, catalysts, stabilizer, and the New FR Product from Preparation Example 1 in a beaker until a homogeneous solution was formed. Pentane was then added into the solution for further mixing. This process was repeated until the desired weight of blowing agent was reached Immediately after addition and incorporation of MDI, the mixture was stirred at 2500 rpm for 6 seconds, and poured into an 8×8×5" (20×20×20 cm) box and allowed to rise fully. The box was then placed in a ventilated hood for 24 hours to cure at room temperature. Samples were then removed from the box, cut into desired size and tested for DIN 4201 B2 as well as limited oxygen index (LOI).

Table 1 summarizes the ingredients, parameters for the foam preparation and the results of the tests.

TABLE 1

Polyisocyanurate Formulation System

| Formulation (parts by weight) | Foam 1 | Foam 2 |
|---|---|---|
| PS-2352 | 100 | 100 |
| Flame Retardant | Fyrol PCF | New FR Product |
| FR Loading | 15.0 | 15.0 |
| PEL-CAT 9540-A | 4.0 | 4.0 |
| PEL-CAT 9650 | 0.8 | 0.8 |
| Niax C-5 | 0.3 | 0.3 |
| B8512 | 2.5 | 2.5 |
| Water | 0.25 | 0.25 |
| N-Pentane | 27.0 | 27.0 |
| PAPI 580N | 166.74 | 200.04 |
| NCO Index | 250 | 250 |
| Cream time (s) | 14 | 12 |
| Gel time (s) | 32 | 32 |
| End of Rise time (s) | 63 | 65 |
| Foam Density ($lbs/ft^3$) | 1.5 | 1.6 |
| DIN 4102 Flame height (cm) | 18.2 | 18.0 |
| LOI (% oxygen) | 20.8 | 21.4 |

Application Example 2

Process of preparing rigid polyurethane foams using the New FR Product was as follows: The pre-weighted polyol, water, catalyst, stabilizer and flame retardants were placed and mixed in a 1000 ml disposable polyethylene (PE) cup until a homogeneous solution was formed. HFC245fa was then added into the solution for further mixing. This process was repeated until the desired weight of blowing agent was reached. The mixture was immediately stirred at 2500 rpm for 3 seconds after MDI was added, and the cup holding all ingredients was then placed on a horizontal bench top inside a ventilated hood and allowed to rise fully. After 24 hours, samples were then removed from the cup, cut into desired size and tested per DIN 4201 B2 and LOI.

Table 2 summarizes the ingredients and parameters for rigid polyurethane foam preparation and the results of the tests:

TABLE 2

| Rigid Polyurethane Formulation System | | |
|---|---|---|
| Formulation (parts by weight) | Foam 1 | Foam 2 |
| HT-5100 | 48.0 | 48.0 |
| R-425X | 25.0 | 25.0 |
| Flame Retardant | F-3014/ FR-513/ Fyrol PCF (30/30/40%) | F-3014/ FR-513/ New FR Product (30/30/40%) |
| FR loading | 12.0 | 12.0 |
| Water | 2.5 | 2.5 |
| HFC-245fa | 5.0 | 5.0 |
| DC-193 | 1.0 | 1.0 |
| BL-11 | 1.0 | 1.0 |
| Polycat 77 | 1.0 | 1.0 |
| BiCAT 8220 | 0.6 | 0.6 |
| Rubinate M | 96.6 | 97.4 |
| NCO Index | 98 | 95 |
| End of Rise time (s) | 35 | 38 |
| Foam Density (lbs/ft$^3$) | 2.0 | 1.9 |
| DIN 4102 Flame height (cm) | 12.0 | 11.9 |
| LOI (% oxygen) | 22.0 | 22.6 |

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. A flame-retarded rigid polyurethane foam comprising the reaction product of a polyol, an isocyanate having an isocyanate index range of from about 400 to about 150 and a flame-retardant-effective amount of a mono-hydroxyl-functional dialkyl phosphinate compound of the formula (I-A):

(I-A)

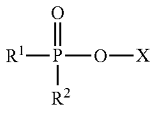

wherein:

$R^1$ and $R^2$ are selected from a linear or branched alkyl group containing from 1 to 4 carbon atoms; and, X is either $-----(Z)_k—R^3$ or 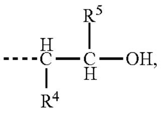 , and when X is $-----(Z)_k—R^3$, Z is $—(Y—O)_n—$, wherein Y is a linear or branched alkylene group containing from 2 to 8 carbon atoms and n represents an integer from 1 to 20;

k may be 0 or 1;

$R^3$ is selected from hydrogen, a mono-hydroxy-terminated linear or branched alkylene group containing from 2 to about 8 carbon atoms; and, provided that when k is zero, $R^3$ is the mono-hydroxy-terminated linear or branched alkylene group and when k is 1, $R^3$ is hydrogen, and when X is

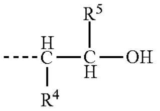

$R^4$ and $R^5$ are each independently selected from H, a linear or branched alkyl group containing from 1 to 8 carbon atoms, a linear or branched alkenyl group containing from 2 to 8 carbon atoms, a halo-substituted alkyl group containing from 1 to 8 carbon atoms, an alkoxy group containing from 1 to 8 carbon atoms, an aryl group containing from 6 to 12 carbon atoms and an alkylaryl group containing from 7 to 16 carbon atoms, or $R^4$ and $R^5$ are bonded to each other to form a cycloalkyl group containing from 5 to about 8 carbon atoms.

2. The flame-retarded rigid polyurethane foam of claim 1, wherein $R^1$ and $R^2$ are each an ethyl group.

3. The flame-retarded rigid polyurethane foam of claim 1, wherein the mono-hydroxyl-functional dialkyl phosphinate compound has the formula (I-A-1):

(I-A-1)

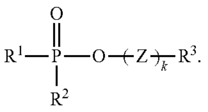

4. The flame-retarded rigid polyurethane foam of claim 3, wherein $R^1$ and $R^2$ are each an ethyl group.

5. The flame-retarded rigid polyurethane foam of claim 1 wherein the mono-hydroxyl-functional dialkyl phosphinate compound has the formula (I-A-2):

(I-A-2)

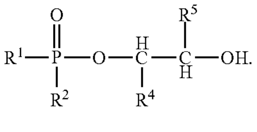

6. The flame-retarded rigid polyurethane foam of claim 5, wherein $R^1$ and $R^2$ are each an ethyl group.

7. The flame-retarded rigid polyurethane foam of claim 1 wherein the reaction product is the reaction product of a polyol, an isocyanate, a flame-retardant-effective amount of a mono-hydroxyl-functional dialkyl phosphinate compound of the formula (I-A) and a halogenated flame retardant and/or a different phosphorous ester flame retardant that is other than that of formula (I-A).

8. The flame-retarded rigid polyurethane foam of claim 7, wherein the halogenated or different phosphorous ester flame retardant is selected from the group consisting of tribromoneopentyl alcohol (FR-513), tribromophenol end-capped brominated epoxy (F-3014), brominated phthalate diols, triethyl phosphate, tris(chloroisopropyl)phosphate (TCPP), diethyl hydroxymethylphosphonate, diethyl N,N-bis(hydroxyethyl) aminomethyl phosphonate (Fyrol 6), and combinations thereof.

9. An article comprising the polyurethane foam of claim 1.

10. An application comprising the article of claim 9, wherein the application is selected from the group consisting of imitation lumber, insulation, packaging, footwear, gasketing, viscoelastic ("memory") foam chemistries, air filter and decorative facings for speakers, foam sheets produced on laminating machines, facings or vapor barriers, and flotation applications.

11. The insulation application of claim 10, which is selected from the group consisting of automotive insulation, sound insulation, tank and pipe insulation, insulation for refrigerators, insulation for freezers, insulation for water heaters, panel insulation for roofs, panel insulation for walls, ceiling insulation, floor insulation, and window and door insulation.

12. A roof structure or a wall structure comprising the panel insulation for roofs or panel insulation for walls of claim 11.

13. A pressurized one-component foam container comprising a polyol, an isocyanate, and a flame-retardant-effective amount of a flame retardant comprising mono-hydroxyl-functional dialkyl phosphinate compound of the formula (I-A):

(I-A)

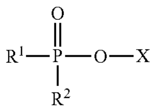

wherein:

$R^1$ and $R^2$ are selected from a linear or branched alkyl group containing from 1 to 4 carbon atoms; and, X is either

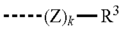 or 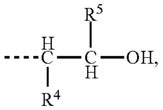

and when X is

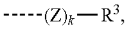

Z is —(Y—O)$_n$—, wherein Y is a linear or branched alkylene group containing from 2 to 8 carbon atoms and n represents an integer from 1 to 20;

k may be 0 or 1;

$R^3$ is selected from hydrogen, a mono-hydroxy-terminated linear or branched alkylene group containing from 2 to about 8 carbon atoms; and, provided that when k is zero, $R^3$ is the mono-hydroxy-terminated linear or branched alkylene group and when k is 1, $R^3$ is hydrogen, and when X is

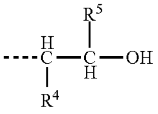

$R^4$ and $R^5$ are each independently selected from H, a linear or branched alkyl group containing from 1 to 8 carbon atoms, a linear or branched alkenyl group containing from 2 to 8 carbon atoms, a halo-substituted alkyl group containing from 1 to 8 carbon atoms, an alkoxy group containing from 1 to 8 carbon atoms, an aryl group containing from 6 to 12 carbon atoms and an alkylaryl group containing from 7 to 16 carbon atoms, or $R^4$ and $R^5$ are bonded to each other to form a cycloalkyl group containing from 5 to about 8 carbon atoms.

* * * * *